(12) United States Patent
Kim et al.

(10) Patent No.: US 8,842,248 B2
(45) Date of Patent: Sep. 23, 2014

(54) DISPLAY DEVICE

(75) Inventors: Ji-Sun Kim, Seoul (KR); Dong-Gyu Kim, Yongin-si (KR); Seong-Young Lee, Anyang-si (KR)

(73) Assignee: Samsung Display Co., Ltd. (KR)

( * ) Notice: Subject to any disclaimer, the term of this patent is extended or adjusted under 35 U.S.C. 154(b) by 318 days.

(21) Appl. No.: 12/903,069

(22) Filed: Oct. 12, 2010

(65) Prior Publication Data

US 2011/0090446 A1  Apr. 21, 2011

(30) Foreign Application Priority Data

Oct. 19, 2009  (KR) .................. 10-2009-0099447

(51) Int. Cl.
*G02F 1/1343* (2006.01)
(52) U.S. Cl.
USPC .............................................. 349/143; 349/39
(58) Field of Classification Search
USPC ............................ 349/109, 145, 146, 39, 143
See application file for complete search history.

(56) References Cited

U.S. PATENT DOCUMENTS

| 7,151,517 | B2 * | 12/2006 | Lee ................................... 345/88 |
| 7,714,970 | B2 * | 5/2010 | Kim et al. ...................... 349/144 |
| 2007/0019145 | A1 * | 1/2007 | Rho et al. ....................... 349/144 |
| 2007/0229748 | A1 * | 10/2007 | Fujita .............................. 349/141 |
| 2008/0117349 | A1 * | 5/2008 | Chang et al. ..................... 349/55 |
| 2008/0218674 | A1 * | 9/2008 | Fan Jiang et al. ............... 349/123 |
| 2009/0102769 | A1 * | 4/2009 | Kouno et al. .................... 345/88 |
| 2009/0115952 | A1 * | 5/2009 | Nakamura et al. ............. 349/143 |
| 2010/0289733 | A1 * | 11/2010 | Kim et al. ........................ 345/92 |

* cited by examiner

*Primary Examiner* — Dennis Y Kim
(74) *Attorney, Agent, or Firm* — Innovation Counsel LLP (57) ABSTRACT

A display device includes a pixel group having first to fourth pixels in a 2×2 matrix, wherein the areas of the first and second pixels is greater than the areas of the third and fourth pixels, so that, when a storage bridge which connects storage electrodes is formed between the first and second pixels, an opening area through which light is transmitted in each of the first and second pixels has the same area as the opening areas in each of the third and fourth pixels.

20 Claims, 7 Drawing Sheets

DISPLAY DEVICE

CROSS-REFERENCE TO RELATED APPLICATION

This application claims priority to and the benefit of Korean Patent Application No. 10-2009-0099447 filed in the Korean Intellectual Property Office on Oct. 19, 2009, the entire contents of which are incorporated herein by reference.

BACKGROUND OF THE INVENTION (a) Field of the Invention

The present invention relates to a display device. More particularly, the present invention relates to a liquid crystal display.

(b) Description of the Related Art

One of the most widely used flat panel displays, a liquid crystal display (LCD) includes two display panels, each provided with field-generating electrodes such as pixel electrodes and a common electrode, and a liquid crystal (LC) layer interposed therebetween. The LCD displays images by applying voltages to the field-generating electrodes so that an electric field is generated across the LC layer. The orientation of the electric field across the LC layer determines the orientation of LC molecules therein, to adjust the polarization of light incident to the LC layer.

The two field-generating electrodes form a liquid crystal capacitor thereby maintaining a voltage after the switching element that applies voltages to the field-generating electrodes is turned off. The liquid crystal display further includes a storage capacitor that assists the liquid crystal capacitor to enhance its voltage maintaining capacity. The storage capacitor generally includes the pixel electrode as one terminal and a storage electrode that overlaps with the pixel electrode as the other terminal.

The storage electrode usually has a line shape, extends in the same direction as the gate lines, and is positioned between gate lines. The storage capacitor is applied with a predetermined voltage such as a common voltage. A number of storage electrodes in the LCD are connected to each other through a bridge. The bridge prevents a change of the voltage applied to the storage electrode such that the storage electrodes maintain equal potential.

Also, pixel defects, which may be created during the manufacturing process, can be repaired by forming the bridge for the storage electrode.

However, when the bridges for the storage electrodes of all pixels are connected to each other, the aperture ratio and the transmittance in the LCD are reduced. Also, it is difficult to repair a pixel defect when the bridges for the storage electrodes are not formed.

The above information disclosed in this Background section is only for enhancement of understanding of the background of the invention and therefore it may contain information that does not form the prior art that is already known to a person of ordinary skill in the art.

SUMMARY OF THE INVENTION

In one aspect, a thin film transistor array panel to improve the aperture ratio and transmittance of a pixel is provided.

A display device includes a pixel group having first to fourth pixels in a 2×2 matrix, wherein the areas of the first and second pixels are greater than the areas of the third and fourth pixels.

The first pixel and the second pixel may neighbor each other in upward and downward directions thereby forming a first column, and the third pixel and the fourth pixel may neighbor each other in upward and downward directions thereby forming a second column.

The transverse width of the first and second pixels forming the first column may be greater than the transverse width of the third and fourth pixels forming the second column.

The display device may include a gate line and a data line intersecting the gate line, the first column and the second column may be divided by the data line, and the first column may be wider than the second column.

The first pixel may be a red pixel, the second pixel may be a blue pixel, the third pixel may be a green pixel, and the fourth pixel may be a white pixel.

Each pixel has an opening area and the difference between the sum of the opening areas of the first pixel and the second pixel, and the sum of the opening areas of the third pixel and the fourth pixel, may be in the range of 0%-2%.

A storage electrode line intersecting the data line and including a storage electrode, and a storage electrode bridge connecting two storage electrode lines disposed on opposite sides of the gate line, may be further included.

The storage electrode bridge may be disposed between the first pixel and the second pixel, and the third pixel and the fourth pixel may not include the storage electrode bridge.

The first pixel may be a red pixel, the second pixel may be a blue pixel, the third pixel may be a green pixel, and the fourth pixel may be a white pixel.

The first pixel and the second pixel may form a first row in a transverse direction, and the third pixel and the fourth pixel may form a second row in the transverse direction.

The longitudinal width of the first and second pixels forming the first row may be greater than the longitudinal width of the third and fourth pixels forming a second row.

The display device may include a gate line and a data line intersecting the gate line, the first row and the second row may be divided by the gate line, and the first row may be wider than the second row.

The first pixel may be a red pixel, the second pixel may be a blue pixel, the third pixel may be a green pixel, and the fourth pixel may be a white pixel.

Each pixel has an opening area, and the difference between the sum of the opening areas of the first pixel and the second pixel, and the sum of the opening areas of the third pixel and the fourth pixel, may be in the range of 0%-2%.

A storage electrode line intersecting the gate line and including a storage electrode, and a storage electrode bridge connecting two storage electrode lines disposed on opposite sides of the data line, may be further included.

The storage electrode bridge may be disposed between the first pixel and the second pixel, and the third pixel and the fourth pixel may not include the storage electrode bridge.

The first pixel may be a red pixel, the second pixel may be a blue pixel, the third pixel may be a green pixel, and the fourth pixel may be a white pixel.

Each pixel includes an opening area, and the difference between the sum of the opening areas of the first pixel and the second pixel, and the sum of the opening areas of the third pixel and the fourth pixel, may be in the range of 0%-2%.

The display device may include: an insulation substrate; a gate line formed on the insulation substrate; first and second storage electrode lines formed on the insulation substrate and disposed on opposite sides of the gate line; a data line intersecting the gate line and the storage electrode lines; a thin film transistor connected to the gate line and the data line; a pixel electrode connected to the thin film transistor; and a storage electrode bridge connecting the first and second storage electrode lines, wherein the storage electrode bridge is separated from the pixel electrode and is made of the same material as the pixel electrode. The first storage electrode is over the first pixel and the second storage electrode is over the second pixel.

The first and second storage electrode lines may be separated from the gate line and may be made of the same material as the gate line.

The first and second storage electrode lines may each include a stem extending according to the gate line and a storage electrode extending according to the data line from the stem, and the storage electrode bridge intersects the gate line and may connect one end of the first storage electrode and the stem of the second storage electrode line.

A passivation layer formed on the storage electrode lines may be further included, and the storage electrode bridge may connect one end of the first storage electrode and the stem of the second storage electrode line through a contact hole of the passivation layer.

The pixel electrode may include a curved portion.

The pixel electrode may include a cutout.

A display device including a pixel group having first to fourth pixels in a 2×2 matrix includes: an insulation substrate; a gate line formed on the insulation substrate; a first and second storage electrode line formed on the insulation substrate and disposed on opposite sides of the gate line; a data line intersecting the gate line and the storage electrode line; and a storage electrode bridge connecting the first and second storage electrode lines, wherein the storage electrode bridge is formed between the first pixel and the second pixel, and the third pixel and the fourth pixel do not include the storage electrode bridge.

The first pixel may be a red pixel, the second pixel may be a blue pixel, the third pixel may be a green pixel, and the fourth pixel may be a white pixel.

A display device including a pixel group having first to fourth pixels in a 2×2 matrix includes: an insulation substrate; a gate line formed on the insulation substrate; a data line intersecting the gate line; a first and second storage electrode line intersecting the gate line and disposed on opposite sides of the data line; and a storage electrode bridge connecting two storage electrode lines, wherein the storage electrode bridge is formed between the first pixel and the second pixel, and the third pixel and the fourth pixel do not include the storage electrode bridge.

The first pixel may be a red pixel, the second pixel may be a blue pixel, the third pixel may be a green pixel, and the fourth pixel may be a white pixel.

According to an exemplary embodiment of the present invention, the transmittance may be improved without a reduction of the aperture ratio of the pixel by differentiating the areas of the pixel including the storage electrode bridge and the pixel that does not include it.

DETAILED DESCRIPTION OF THE EMBODIMENTS

The present invention will be described more fully hereinafter with reference to the accompanying drawings, in which exemplary embodiments are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present.

Figure 1:
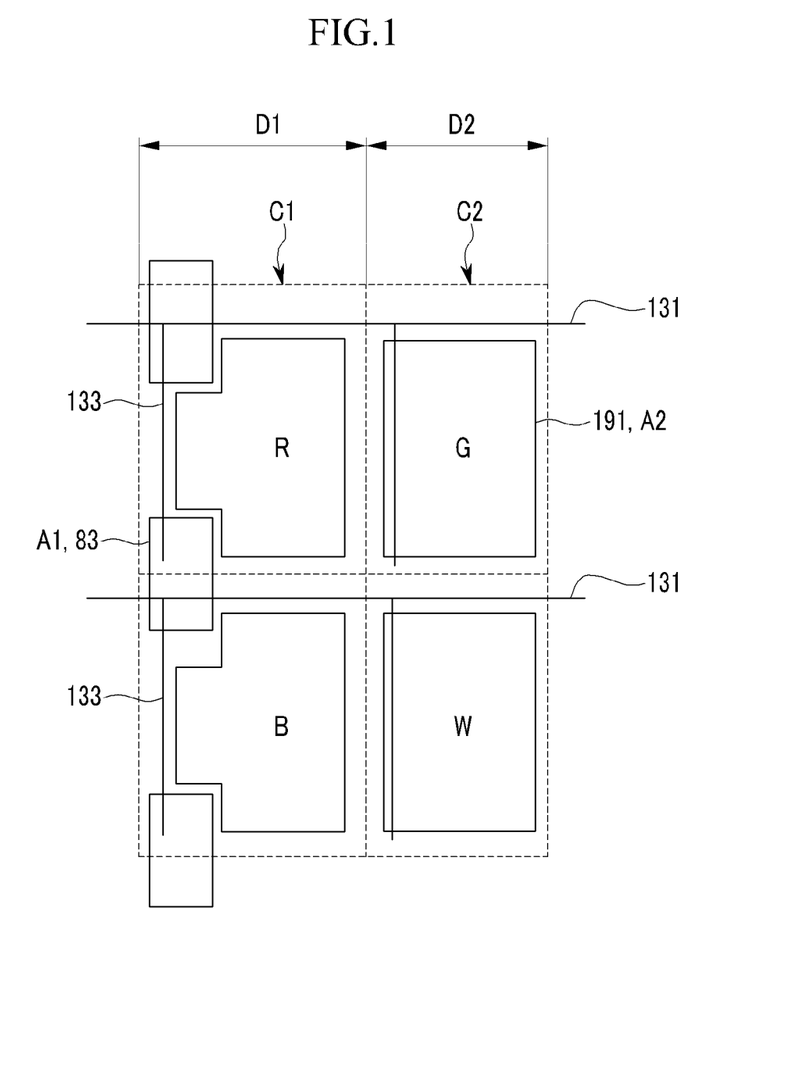
FIG. 1 is a view showing pixels of a liquid crystal display according to an exemplary embodiment, and shows a storage electrode line, a storage electrode bridge, and one pixel group including red (R), green (G), blue (B), and white (W) pixels.
Figure 2:
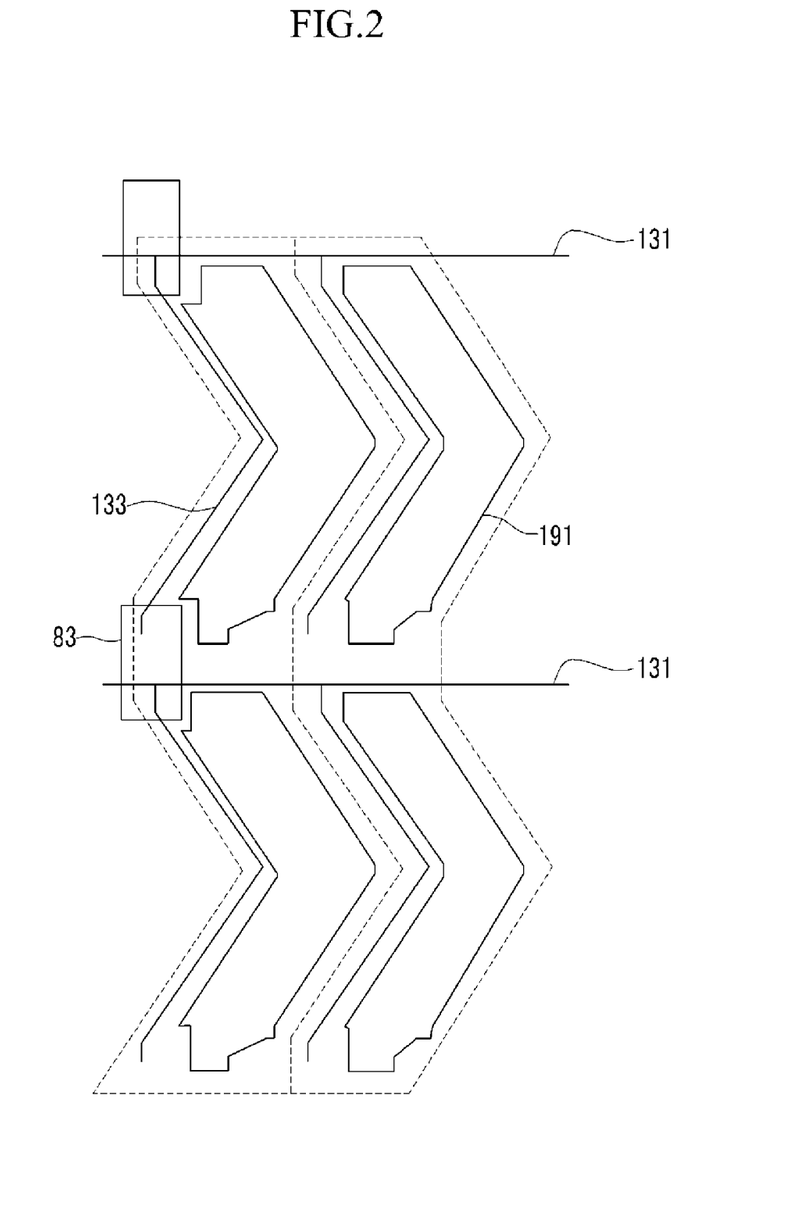
FIG. 2, FIG. 3 and FIG. 4 are views showing a pixel group according to another exemplary embodiment.
Figure 3:
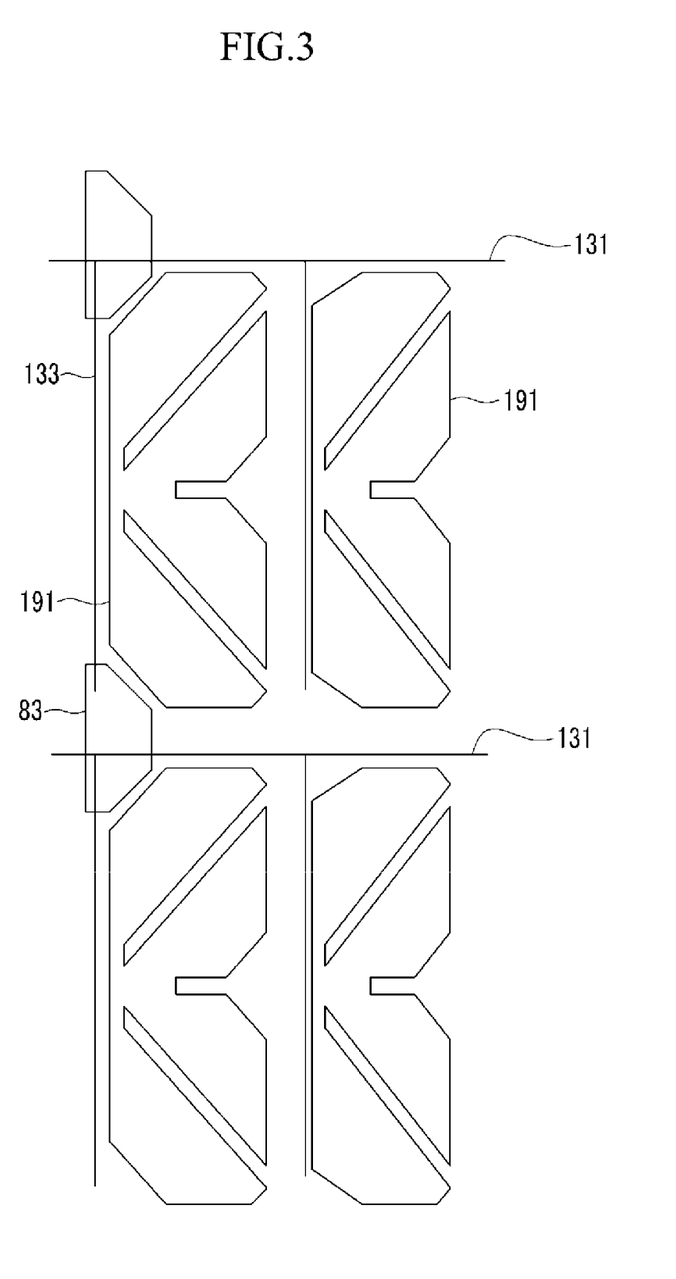
Figure 4:
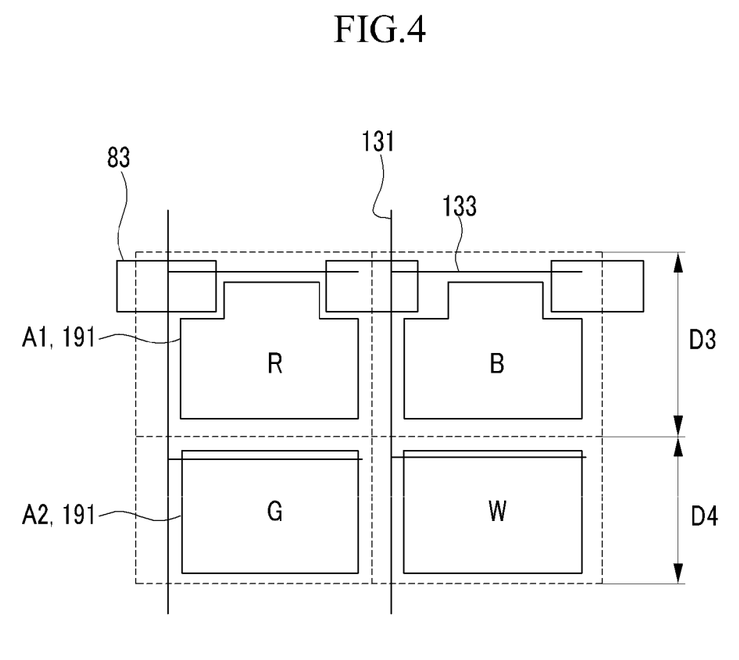

FIG. 1 is a view showing pixels of a liquid crystal display according to an exemplary embodiment, and shows a storage electrode line, a storage electrode bridge, and one pixel group including red (R), green (G), blue (B), and white (W) pixels. FIG. 2 to FIG. 4 are views of pixel groups according to another exemplary embodiment.

As shown in FIG. 1, a red pixel R a green pixel G a blue pixel B, and a white pixel W are disposed in a 2×2 matrix and, collectively, form a pixel group. A liquid crystal display typically includes a pixel array that has a large number of such pixel groups.

A storage electrode line 131 is extended in a transverse direction, and a storage electrode 133 is extended in the downward direction from the storage electrode line 131. The storage electrode line 131 and the storage electrode 133 in the top row of the pixel group (that is, over the R and G pixels) are connected to storage electrode line 131 and storage electrodes 133 on neighboring pixels in the adjacent, lower row of the pixel group (that is, over the B and W pixels) through a storage electrode bridge 83.

The storage electrode bridge 83 connects the storage electrodes 133 and the storage electrode lines 131 of two neighboring pixels such that the storage electrode lines 131 is has uniform voltage anywhere within a pixel array.

For an individual pixel electrode 191 which has an adjacent storage bridge 83, (for instance, pixel electrode 191 of pixel R) the storage electrode bridge 83 is located at one corner of a pixel electrode 191. The boundary of the pixel electrode 191 that is close to the storage electrode bridge 83 forms a concave shape near the storage electrode bridge 83 such that the pixel electrode 191 does not touch the bridge 83. Thus, for a pixel electrode 191 that is adjacent to a storage electrode, the region occupied by the storage electrode is not also occupied by the pixel electrode. Accordingly, in a conventional pixel matrix, for a pixel electrode 191 that is adjacent to a storage electrode bridge 83, the area occupied by the pixel electrode 191 is reduced by the area occupied by the storage electrode bridge 83 to accommodate the storage electrode bridge 83.

When the area of the pixel electrode 191 is reduced, the aperture ratio and the transmittance of the pixel are also reduced. Accordingly, in an exemplary embodiment, the storage electrode bridges 83 are only formed in a portion of the area occupied by the pixel.

Each individual pixel of the liquid crystal display includes a thin film transistor, a pixel electrode, and a color filter. The area occupied by the pixel is referred to as the "pixel area" and is the region defined by the dashed lines in FIG. 1. In one embodiment, the transverse width D1 of the pixels R and B of the first column C1 where the storage electrode bridges 83 are formed is greater than the width of the transverse width D2 of the pixels G and W of the second column C2, where the storage electrode bridges are not formed. As a result, the pixel area of each of the pixels in the first column is greater than the pixel area of each of the pixels in the second column.

In an exemplary embodiment, each pixel has a quadrangular shape. However, as shown in FIG. 2, the pixel electrode is bent such that the pixel may be bent, and as shown in FIG. 3, the pixel electrode includes a cutout such that the pixel may be divided into a plurality of domains.

The opening areas A1 and A2 in FIG. 1 are areas substantially displaying an image, except for a portion where the pixel electrode is covered by a light blocking member (not shown) or wiring (not shown). In an exemplary embodiment of the present invention, the area of each of the opening areas A1 and A2 of the different pixels in the pixel group may be equally maintained, in other words, held constant, by making the pixel area that contains opening area A1 of the first column pixels different from the pixel area containing opening area A2 of the second column pixels.

If the pixel area is increased, the area occupied by the pixel electrode in that pixel area can also be increased, thereby increasing the opening area, for instance opening area A1. Accordingly, in an exemplary embodiment, the pixel areas of the first column in FIG. 1 are increased by half of the amount that the opening area is decreased as a result of the storage electrode bridge, and the pixel areas of the second column are decreased by the half of the amount that the opening area is decreased by the storage electrode. As a result, the opening area A1 of the first column pixel and the opening area A2 of the second column pixel may be equally maintained. It is desirable that the difference between the opening area A1 of the first column pixels and the opening area A2 of the second column pixels is in the range of 0-2% considering a process error. When the difference is more than 2%, the color coordination between two pixels is altered and the transmittance is reduced.

In an exemplary embodiment, when a pixel array of a liquid crystal display includes pixels in which the pixel areas of the pixels are adjusted to form opening areas that have the same area whether or not they are adjacent to storage electrode bridges, the transmittance of the liquid crystal display is increased from 8.8% to 9.1% as compared with the conventional art in which the pixel areas are equal to each other and the areas of the opening areas are different due to the storage electrode bridges.

In another exemplary embodiment, the storage electrode bridge 83 is formed in the blue pixel B thereby connecting the storage electrode 133 and the storage electrode line 131 of the red pixel R neighboring the blue pixel B. The storage bridge 83 is typically formed in the blue pixel because the luminance change in a blue pixel as a result of a change of the opening area of the blue pixel B is little recognized as compared to the other pixels G and W.

In the above exemplary embodiment, the transverse width of the first column C1 and the second column C2 is adjusted to adjust the pixel area.

However, as shown in FIG. 4, the storage electrode line 131 is formed in the longitudinal direction and the storage electrode 133 is formed in the transverse direction such that the storage electrode bridge 83 may connect the storage electrode line 131 and the storage electrode 133 that are disposed in two pixels that are neighbors in the horizontal direction.

When the storage electrode bridge 83 connects the storage electrode line 131 and the storage electrode 133 that are disposed in two pixels that are neighbors in the horizontal direction, the pixel areas A1 and A2 may be controlled by making the longitudinal widths D3 and D4 of the pixels different.

Next, a thin film transistor array panel including the red pixel, the green pixel, the blue pixel, and the white pixel will be described with reference to FIG. 5 and FIG. 6.

Figure 5:
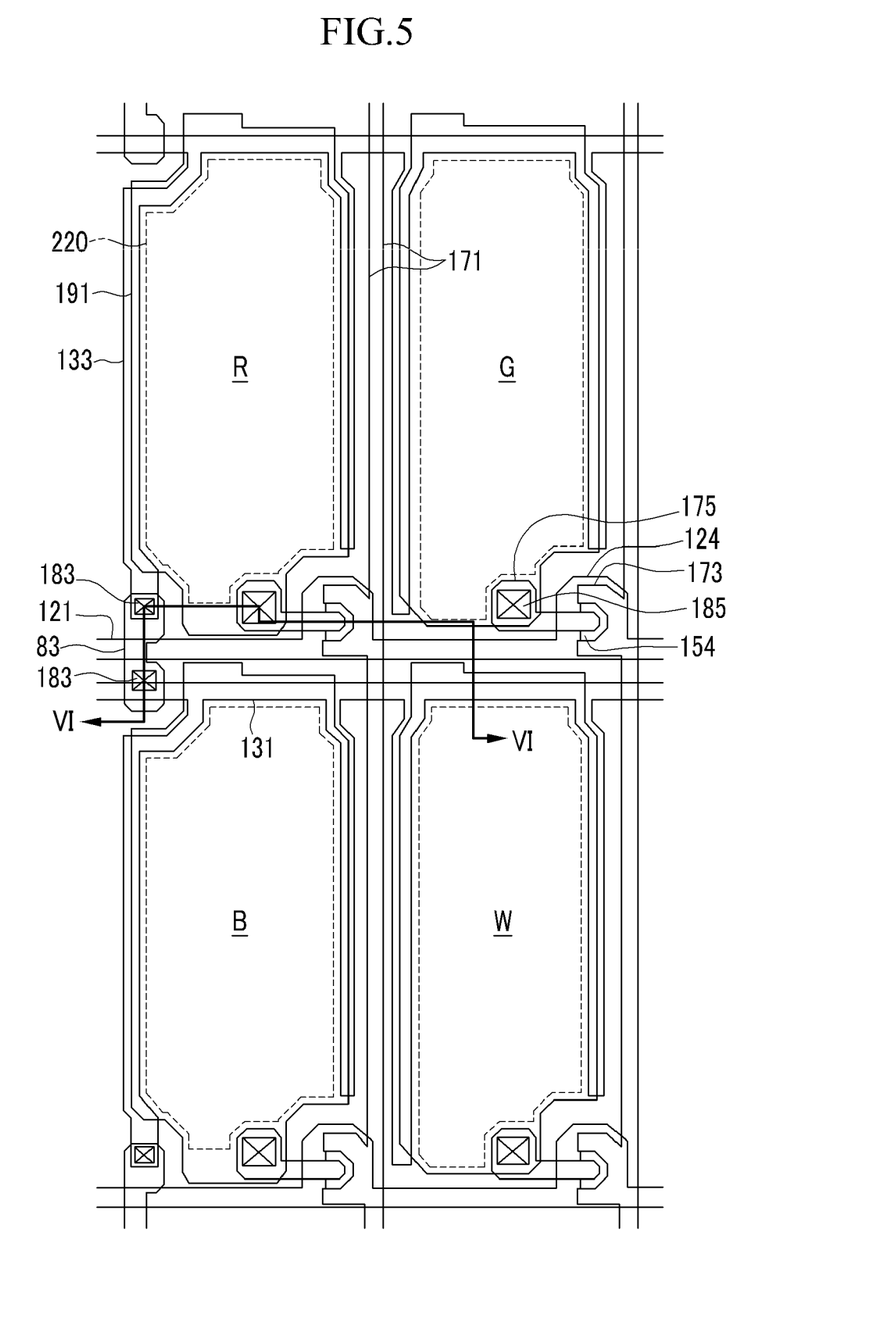
FIG. 5 is a layout view of a liquid crystal display according to an exemplary embodiment.
Figure 6:
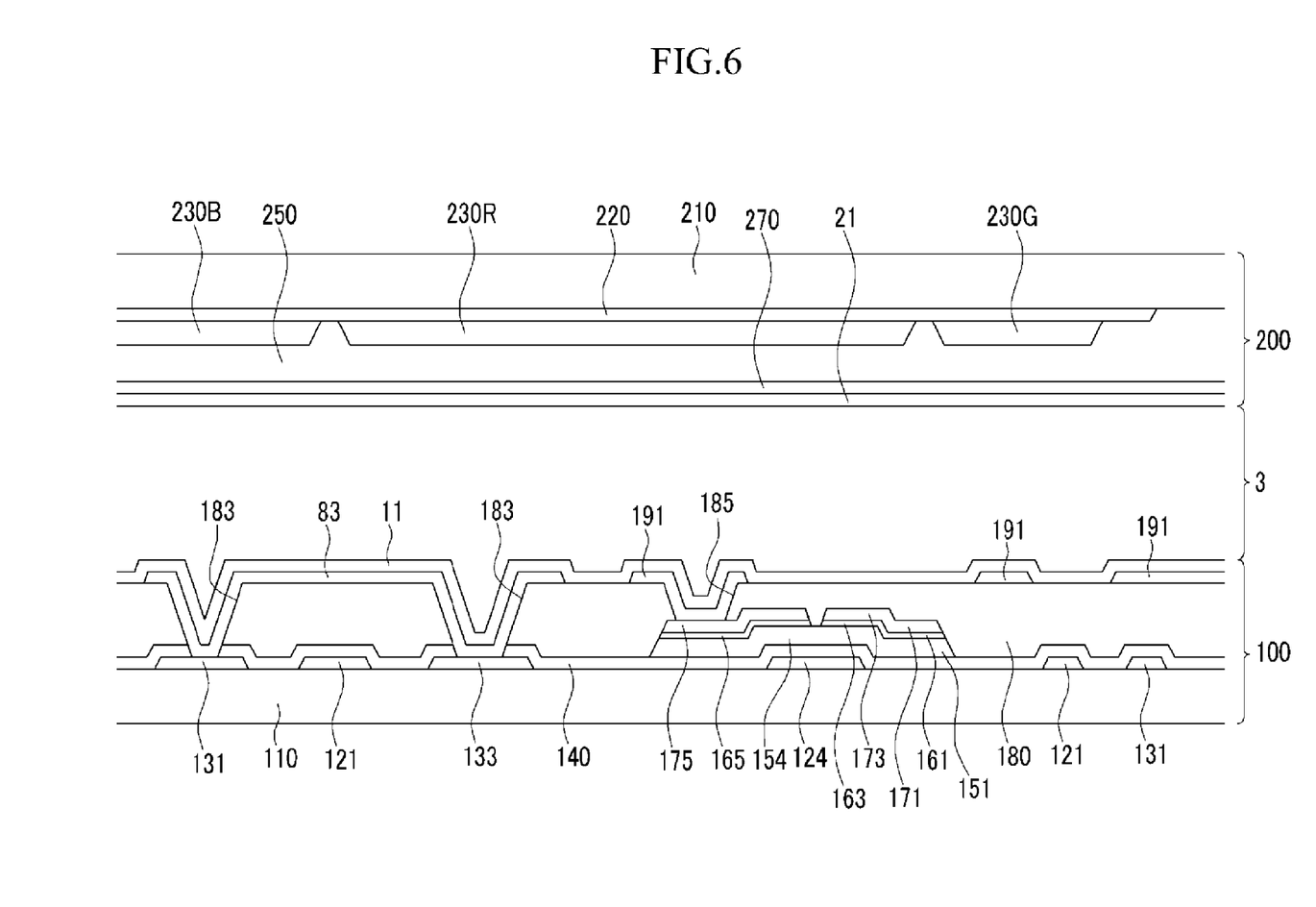
FIG. 6 is a cross-sectional view taken along the line VI-VI of FIG. 5.

FIG. 5 is a layout view of a liquid crystal display according to an exemplary embodiment, and FIG. 6 is a cross-sectional view taken along the line VI-VI of FIG. 5.

As shown in FIG. 5 and FIG. 6, a liquid crystal display according to the present exemplary embodiment includes a thin film transistor array panel 100 and a common electrode panel 200 facing to each other, and a liquid crystal layer 3 interposed therebetween.

First, the thin film transistor array panel will be described.

A plurality of gate lines 121 and a plurality of storage electrode lines 131 are formed on an insulation substrate 110 made of transparent glass or plastic.

The gates lines 121 transfer gate signals and extend substantially in a transverse direction. Each of the gate lines 121 include a plurality of gate electrodes 124 that protrude upward, and an end portion of the gate lines 121 may have a wide area for connecting with other layers or external driving circuits.

The storage electrode lines 131 receive a predetermined voltage, and extend parallel to the gate lines 121. The storage electrode lines 131 include a plurality of storage electrodes 133 that branch downward from the storage electrode lines 131. One end of the storage electrode 133 may have a wide area for connecting with other layers. However, the shape and arrangement of the storage electrode lines 131 may be variously changed.

A gate insulating layer 140 made of silicon nitride (SiNx) or silicon oxide (SiOx) is formed on the gate lines 121 and the storage electrode lines 131.

A plurality of semiconductor stripes 151 that are made of hydrogenated amorphous silicon (a-Si is an abbreviation for amorphous silicon), polysilicon, or so on are formed on the gate insulating layer 140. The semiconductor stripes 151 generally extend in a longitudinal direction, and include a plurality of projections 154 that extend toward the gate electrodes 124.

A plurality of ohmic contact stripes 161 and a plurality of ohmic contact islands 165 are formed on the semiconductor stripes 151. The ohmic contact stripes 161 and the ohmic contact islands 165 can be made of a material such as n+ hydrogenated amorphous silicon in which an n-type impurity such as phosphor is doped with a high density, or can be made of silicide. The ohmic contact stripes 161 include a plurality of projections 163, and the projections 163 and the ohmic contact islands 165 are disposed as pairs on the projections 154 of the semiconductor stripes 151.

A plurality of data lines 171 and a plurality of data electrodes 175 are formed on the ohmic contact stripes and islands 161 and 165 and the gate insulation layer 140.

The data lines 171 transfer data signals and mainly extend in a longitudinal direction, thereby intersecting the gate lines 121. Each data line 171 crosses a storage electrode line 131 and runs between a set of adjacent storage electrodes 133.

Each data line 171 includes a plurality of source electrodes 173 extending toward the gate electrodes 124, and an end portion of the data line 171 may have a wide area for forming a connection with other layers or an external driving circuit.

The drain electrodes 175 are separated from the data lines 171 and face the source electrodes 173 with respect to the gate electrodes 124. One end of the drain electrode 175 is enclosed by a portion of the source electrode 173 and the other end thereof is expanded for forming a connection with other layers.

One gate electrode 124, one source electrode 173, and one drain electrode 175 constitute a thin film transistor (TFT) together with the projection 154 of the semiconductor stripe 151, and a channel of the TFT is formed at the projection 154 between the source electrode 173 and the drain electrode 175.

The ohmic contact stripes and islands 161 and 165 exist only between the underlying semiconductor stripes 151 and the overlying data lines 171 and drain electrodes 175 so as to lower contact resistance therebetween. Some portions of each semiconductor stripe 151, including, for example, a portion between the source electrode 173 and the drain electrode 175, are exposed, without being covered by the data line 171 and the drain electrode 175.

A passivation layer 180 is formed on the data lines 171, the drain electrodes 175, and the exposed portions of the semiconductor stripes 151. The passivation layer 180 is made of an inorganic insulator or an organic insulation material, etc., and can have a planarized surface.

The passivation layer 180 has a plurality of contact holes 185 that expose the drain electrode 175, and a plurality of contact holes 183 that expose the storage electrode line 131 and the storage electrode 133.

A plurality of pixel electrodes 191 and a plurality of storage electrode bridges 83 are formed on the passivation layer 180. They may be made of a transparent conductive material such as ITO or IZO, or a reflective metal such as aluminum, silver, chromium, or alloys thereof.

The pixel electrode 191 is physically and electrically connected with the drain electrode 175 through the contact hole 185, and receives a data voltage from the drain electrode 175.

The storage electrode bridge 83, which transverses the gate line 121, is connected with the exposed portion of the storage electrode line 131 and the exposed end portion of the storage electrode 133 via the contact holes 183 that are positioned on opposite sides of the gate line 121. Here, the storage electrode bridge 83 may be connected to the end of the storage electrode line 131 and the storage electrode 133. The storage electrode bridge 83 connects the storage electrode lines 131 that are separated from each other by the gate line 121, which is interposed therebetween, such that deterioration as a result of disconnection of the storage electrode line 131 may be reduced, and the resistance of the storage electrode line 131 may be reduced, and thereby a voltage difference of the storage electrode lines 131 according to their positions in the pixel arrays may be reduced.

Figure 7:
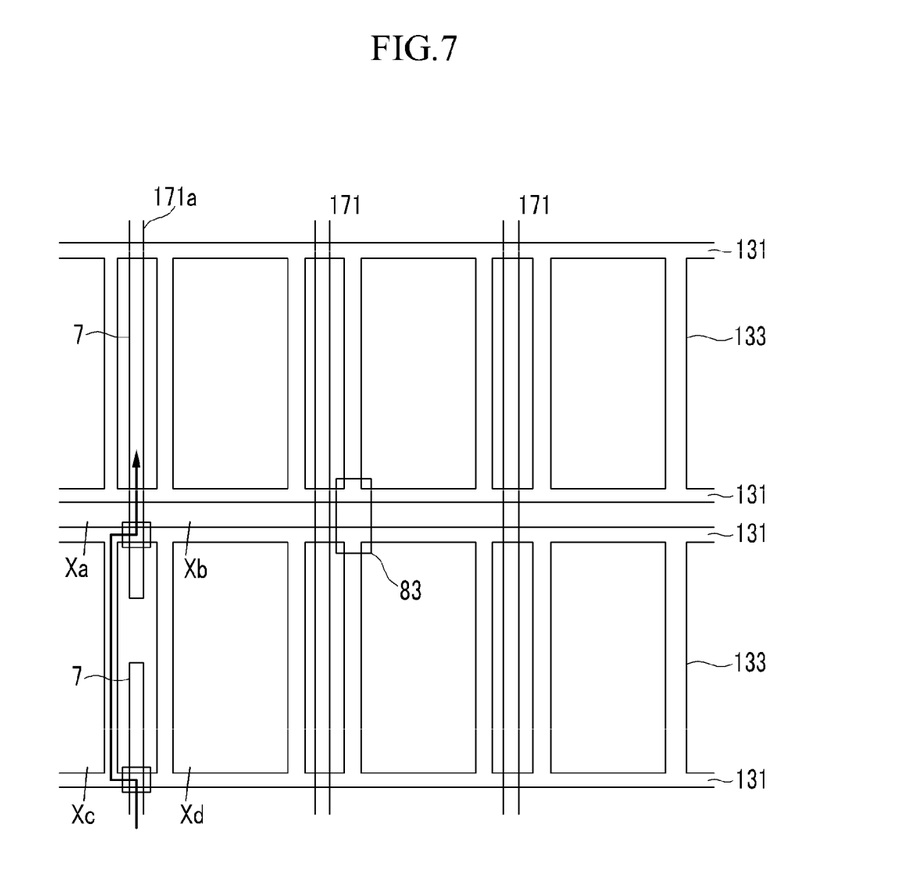
FIG. 7 is a view illustrating a storage electrode line according to an exemplary embodiment and a repairing method using the same.

The storage electrode line 131 including the storage electrode 133 may be used, along with the storage electrode bridge 83, to repair a pixel defect due to disconnection of the data line 171. Referring to FIG. 7, the storage electrode lines 131 are disposed on both sides with respect to the pixels.

When the data line 171 is disconnected (for instance, data line 171a), the storage electrode line 131 and the storage electrode 133 that are connected to the storage electrodes 133 disposed on both sides of the disconnected data line are separated by using a laser, which is indicated by lines Xa, Xb, Xc and Xd in FIG. 7. Thus, the storage electrodes 133 disposed on both sides of the disconnected data line 171a are separated from the storage electrode line 131 such that it is a metal layer through which no signal is input. Next, the disconnected data line and the storage electrode 133 overlapping thereto are shorted through the laser such that they are electrically connected to each other. Accordingly, the signal applied to the disconnected data line 171a is detoured through the storage electrodes 133 disposed on both sides of the disconnected data line such that the signal may be transmitted to the thin film transistor (as indicated by the bold line arrow).

On the other hand, although the storage electrode line 131 is separated to repair the disconnected data line, the remaining storage electrode lines 131 except for the repaired pixel are connected to the storage electrode bridge 83, and thereby the storage signal is transmitted to the remaining storage electrode lines 131. The storage electrode bridge 83 is positioned near the left corner of the pixel electrode 191 and the boundary of the pixel electrode 191 adjacent to the storage electrode bridge 83 has a concave portion.

Next, the common electrode panel 200 will be described with reference to FIG. 5 and FIG. 6.

A light blocking member 220 is formed on an insulation substrate 210 made of transparent glass or the like. The light blocking member 220 is also called a black matrix and prevents light leakage. The light blocking member 220 includes a plurality of openings facing the pixel electrodes 191. The plurality of openings in the light blocking member 220 have substantially the same shape as the pixel electrodes 191. The light blocking member 220 can include a portion corresponding to the gate line 121 and the data line 171 and a portion corresponding to the TFT.

A plurality of color filters 230 are also formed on the substrate 210. The color filters 230R, 230G, and 230B are mostly positioned inside a region surrounded by the light blocking member 220. Each color filter 230R, 230G, and 230B can display one of red, green, blue, and white colors. The white pixel does not include an additional color filter including pigments, differently from the red, green, and blue color filters, and all the light received by the white pixel may be transmitted.

Also, the color filters 230R, 230G and 230B may be formed in the thin film transistor array panel 100.

An overcoat 250 is formed on the color filters 230 and the light blocking members 220. The overcoat 250 prevents the color filters 230 from being exposed and provides a planarized surface, and may be omitted.

A common electrode 270 is formed overcoat 250. The common electrode 270 is made of a transparent conductor such as ITO, IZO, or the like.

Alignment layers 11 and 21 are respectively coated on each of the inner surfaces of the two display panels 100 and 200. Polarizers are provided on the outer surface of the display panels 100 and 200, and the polarization axes of the two polarizers are perpendicular or parallel to each other. In a reflective liquid crystal display, one of the two polarizers may be omitted.

Referring to FIG. 5, the red, green, blue, and white pixels are divided by the data line 171 and the gate line 121. In this case, the red and blue pixels are wider than the green and white pixels in the pixel areas defined by the data line 171 and the gate line 121.

However, the blue pixel and the red pixel include the storage electrode bridge 83 such that the opening area thereof is equal to the opening area of the green pixel and the white pixel, or the difference of the opening areas therebetween may be less than 2%.

The storage electrode bridge 83 connects the red and blue pixels disposed in the upward and downward directions with respect to gate line 121 such that the area of the red and blue pixels and the area of the green and white pixels may be changed by controlling the interval between two data lines.

As shown in FIG. 4, when the storage electrode bridge connects the transverse pixels, the area of the red and blue pixels and the area of the green and white pixels may be different by the interval between two neighboring gate lines 121.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising
a pixel group having first to fourth pixels in a 2×2 matrix, wherein each pixel occupies a pixel area,
the pixel areas of the first and second pixels are greater than the pixel areas of the third and fourth pixels,
each pixel includes an opening area,
the difference between the sum of the opening areas of the first pixel and the second pixel, and the sum of the opening areas of the third pixel and the fourth pixel, is in the range of 0%-2%, and
the opening area is an area within the pixel area that substantially displays an image,
wherein the first pixel and the second pixel neighbor each other in upward and downward directions thereby forming a first column,
the third pixel and the fourth pixel neighbor each other in upward and downward directions thereby forming a second column, and
wherein a storage electrode bridge is disposed between the first pixel and the second pixel in the first column, and the second column does not include the storage electrode bridge.

2. The display device of claim 1, wherein
the transverse width of the first and the second pixels forming the first column is greater than the transverse width of the third and fourth pixels forming the second column.

3. The display device of claim 2, wherein
the display device includes a gate line and a data line intersecting the gate line,
the first column and the second column are divided by the data line, and
the first column is wider than the second column.

4. The display device of claim 3, wherein
the first pixel is a red pixel, the second pixel is a blue pixel, the third pixel is a green pixel, and the fourth pixel is a white pixel.

5. The display device of claim 3, further comprising:
a first storage electrode line intersecting the data line and including a first storage electrode,
a second storage electrode line intersecting the data line and including a second storage electrode, the first and the second storage electrode lines are disposed on opposite sides of the gate line and
the storage electrode bridge connecting the first and the second storage electrode lines.

6. The display device of claim 5, wherein
the first pixel is a red pixel, the second pixel is a blue pixel, the third pixel is a green pixel, and the fourth pixel is a white pixel.

7. The display device of claim 1, wherein
the first pixel is a red pixel, the second pixel is a blue pixel, the third pixel is a green pixel, and the fourth pixel is a white pixel.

8. The display device of claim 1, wherein
the display device includes:
an insulation substrate;
a gate line formed on the insulation substrate;
first and second storage electrode lines formed on the insulation substrate and disposed on opposite sides of the of the gate line;
a data line intersecting the gate line and the first and the second storage electrode lines;
a thin film transistor connected to the gate line and the data line;
a pixel electrode connected to the thin film transistor; and
the storage electrode bridge connecting the first and the second storage electrode lines,
wherein the storage electrode bridge is separated from the pixel electrode and is made of the same material as the pixel electrode.

9. The display device of claim 8, wherein
the first storage electrode line is separated from the gate line and is made of the same material as the gate line.

10. The display device of claim 9, wherein
the first storage electrode line includes a stem extending according to the gate line and a first storage electrode extending according to the data line from the stem,
the second storage electrode line includes a stem extending according to the gate line and a second storage electrode extending according to the data line from the stem, and
the storage electrode bridge intersects the gate line and connects one end of the first storage electrode and the stem of the second storage electrode line.

11. The display device of claim 10, further comprising
a passivation layer formed on the first and the second storage electrode lines, and
wherein the storage electrode bridge connects one end of the first storage electrode and the stem of the second storage electrode line through a contact hole of the passivation layer.

12. The display device of claim 8, wherein
the pixel electrode includes a curved portion.

13. The display device of claim 8, wherein
the pixel electrode includes a cutout.

14. A display device comprising
a pixel group having first to fourth pixels in a 2×2 matrix, wherein each pixel occupies a pixel area,
the pixel areas of the first and second pixels are greater than the pixel areas of the third and fourth pixels,
each pixel includes an opening area,
the difference between the sum of the opening areas of the first pixel and the second pixel, and the sum of the opening areas of the third pixel and the fourth pixel, is in the range of 0%-2%, and
the opening area is an area within the pixel area that substantially displays an image.
wherein the first pixel and the second pixel form a first row in a transverse direction,
the third pixel and the fourth pixel form a second row in the transverse direction, and
wherein the storage electrode bridge is disposed between the first pixel and the second pixel in the first row, and the second row does not include the storage electrode bridge.

15. The display device of claim 14, wherein
the longitudinal width of the first and second pixels forming the first row is greater than the longitudinal width of the third and fourth pixels forming the second row.

16. The display device of claim 15, wherein
the display device includes a gate line and a data line intersecting the gate line,
the first row and the second row are divided by the gate line, and
the first row is wider than the second row.

17. The display device of claim 16, wherein
the first pixel is a red pixel, the second pixel is a blue pixel, the third pixel is a green pixel, and the fourth pixel is a white pixel.

18. The display device of claim 16, further comprising
a first storage electrode line intersecting the gate line and including a first storage electrode,
a second storage electrode line intersecting the gate line and including a second storage electrode, the first and second storage electrode lines disposed on opposite sides of the data line, and
the storage electrode bridge connecting the first and second storage electrode lines.

19. The display device of claim 14, wherein
the first pixel is a red pixel, the second pixel is a blue pixel, the third pixel is a green pixel, and the fourth pixel is a white pixel.

20. A display device including a pixel group having first to fourth pixels in a 2×2 matrix, comprising:
an insulation substrate;
a gate line formed on the insulation substrate;
first and second storage electrode lines formed on the insulation substrate and disposed on opposite sides of the gate line;
first to fourth pixel electrodes in each of the first to fourth pixels;
a data line intersecting the gate line and the first and the second storage electrode lines; and
a storage electrode bridge connecting the first and the second storage electrode lines,
wherein the storage electrode bridge is formed adjacent to the first pixel and the second pixel, and the third pixel and the fourth pixel do not include the storage electrode bridge,
wherein a boundary of the first pixel electrode forms a concave shape near a first end of the storage electrode bridge and above a first side of the gate line in a plan view, and a boundary of the second pixel electrode forms a concave shape near an opposite end of the storage electrode bridge and under an opposite side of the gate line in a plan view, and
wherein each pixel includes an opening area and the difference between the sum of the opening areas of the first pixel and the second pixel, and the sum of the opening areas of the third pixel and the fourth pixel, is in the range of 0%-2%.

* * * * *